United States Patent Office 2,695,907
Patented Nov. 30, 1954

2,695,907

STEROID COMPOUNDS

Herbert C. Murray, Hickory Corners, and Durey H. Peterson, Kalamazoo Township, Kalamazoo County, Mich., assignors to The Upjohn Company, Kalamazoo, Mich., a corporation of Michigan No Drawing. Application June 5, 1953,
Serial No. 359,966

15 Claims. (Cl. 260—397.45)

The present invention relates to steroid compounds, and is more particularly concerned with novel 11α-oxygenated - 17β - hydroxy - 17α - methyletiocholane - 3 - ones, specifically 11α,17β-dihydroxy-17α-methyletiocholane-3-one and 11α-acylates thereof, and to a novel process for their production.

The novel 11α-oxygenated-17β-hydroxy-17α-methyletiocholane-3-ones of the present invention may be represented by the structural formula:

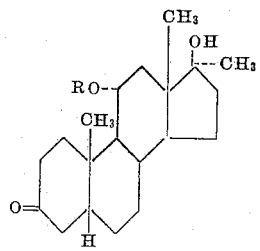

wherein R is selected from the group consisting of hydrogen and the acyl radical of an organic carboxylic acid, especially a hydrocarbon carboxylic acid, and preferably containing less than nine carbon atoms.

The process of the present invention consists in selectively hydrogenating 11α-hydroxy-17α-methyltestosterone in the presence of a palladium catalyst to give 11α,17β - dihydroxy - 17α - methyletiocholane - 3 - one, which, by selective acylation with an acylating agent, for example, an acid, acid halide, acid anhydride, ketene, etc., yields the corresponding 11α-acyloxy-17β-hydroxy-17α-methyletiocholane-3-one.

It is an object of this invention to provide 11α,17β-dihydroxy-17α-methyletiocholane-3-one, 11α-acyloxy-17β-hydroxy-17α-methyletiocholane-3-ones, and a process of preparing the same. Other objects will be apparent to those skilled in the art to which this invention pertains.

The compounds of the present invention, 11α,17β-dihydroxy-17α-methyletiocholane-3-one and 11α-acylates thereof, have utility as pharmacologically and physiologically active agents. They exhibit anabolic, renotropic and anesthetic activity, while possessing only a low androgenic activity. They are furthermore valuable intermediates for the synthesis of known chemical compounds. For example, dehydration of 11α,17β-dihydroxy-17α-methyletiocholane-3-one with phosphorus oxychloride or hydrogen chloride in methanol to obtain 11α-hydroxy-17-methylene-etiocholane-3-one, followed by oxidation of the 11α-hydroxy group with chromium trioxide and ozonization of the 17-methylene group is productive of the known etiocholane-3,11,17-trione [Lieberman, J. Biol. Chem. 166, 773 (1946)] which possesses a general anesthetic effect.

The starting compound of the present invention, 11α-hydroxy-17α-methyltestosterone, is prepared by the oxidation of 17α-methyltestosterone by means of a mold, the *Rhizopus nigricans* minus strain, as shown in detail in Preparation 1.

In carrying out the process of the present invention, 11α-hydroxy-17α-methyltestosterone, dissolved in an organic solvent is hydrogenated in the presence of a palladium catalyst, usually supported on a catalyst support, such as carbon or charcoal, and preferably supported on a carbonate, oxide or a mixture of the carbonates and oxides of a group 2B element of the periodic table.

Some of the palladium catalysts utilized in the process of the present invention are already well known in the art. The preferred catalysts are formed by adding an excess of a dilute aqueous solution of an alkali metal carbonate, such as sodium carbonate, to a warm, aqueous solution of a chloride or other water-soluble salt of any of the elements in group 2B of the periodic table, namely, zinc, cadmium and mercury, such as, for example, a zinc chloride solution, to form the precipitated carbonate of the group 2B element, as, for example, zinc carbonate. A twenty percent aqueous solution of sodium carbonate added to an aqueous ten percent zinc chloride solution at about seventy degrees centigrade is a very satisfactory procedure for forming the precipitated zinc carbonate. The precipitated carbonate of the group 2B element is next slurried in an aqueous solution of a water-soluble palladium salt, such as palladium chloride, aqueous formaldehyde or other lower alkyl aldehyde added, and the resulting mixture warmed at a temperature between about thirty and ninety degrees centigrade, the preferred temperature being sixty degrees centigrade. The warmed mixture is made alkaline with an alkali metal hydroxide, such as aqueous potassium hydroxide, a pH of about nine being preferred, whereupon the palladium separates from the alkaline medium as a black-colored precipitate on the group 2B metal carbonate, such as zinc carbonate. The thus-formed palladium catalyst supported on the metal carbonate is subsequently washed with water by decantation, filtered or separated by any convenient method from the aqueous washings, and dried. Drying may be accomplished at room temperature in vacuo or it may be done at elevated temperatures from about room temperature to about 250 degrees centigrade, about 210 degrees centigrade being preferred. The period of drying is dependent on the temperature used and may vary between about one hour and about 100 hours, with about 75 hours at about 210 degrees centigrade being preferred.

The composition of the catalyst support, as indicated by carbonate analysis, is dependent on the amount of heating involved in the drying operation. Drying between room temperature and a temperature of about 110 degrees centigrade for as long as thirty hours has no appreciable effect on the catalyst support which remains as the carbonate on the group 2B metal. Heating at elevated temperatures, as, for example, 210 degrees for forty hours, causes the metal carbonate to lose carbon dioxide and form the metal oxide which then acts as the catalyst support. Heating at intermediate temperatures results in incomplete conversion of the metal carbonate to the metal oxide and the resulting catalyst support is a mixture of the carbonate and the oxide of the group 2B metal. The composition of the catalyst support, in respect to the amount of carbonate or oxide present, is not critical, since both the metal carbonate and the metal oxide and mixtures thereof give equivalent results when used in carrying out the process of the present invention.

A palladium catalyst supported on precipitated cadmium carbonate, cadmium oxide, or a mixture thereof, prepared in essentially the same manner can be advantageously employed, while a palladium catalyst supported on corresponding mercury compounds is likewise useful. Palladium or palladium on charcoal or other support is similarly useful, although not preferred.

The preferred order of hydrogenation is first to subject the palladium on group 2B metal carbonate, oxide, or a mixture thereof, catalyst to hydrogen in conventional hydrogenation apparatus to reduce the catalyst prior to the introduction of the starting steroid material. It is not essential that the catalyst be in a solvent medium, but methanol, hexane, acetone, methyl ethyl ketone, ethanol, or like organic solvent may be advantageously employed. Preferably, an alcohol solvent is used. Alternatively, the catalyst and starting steroid to be hydrogenated can be contacted together in a solvent medium prior to introduction of the hydrogen. It is not necessary to conduct the reaction under super-atmospheric pressure, although, when super-atmospheric pressure is utilized, a hydrogen pressure of about one to 100 pounds or more above atmospheric pressure is operative. Any suitable temperature between about zero and 100 degrees centigrade may be employed, with room temperature e. g., about 20–30 degrees centigrade, being satisfactory. In the preferred embodiment of the present invention, 11α-hydroxy-17α-methyltestosterone is added to the already reduced catalyst and hydrogenation with hydrogen at atmospheric pressure continued until approximately one molar equivalent of hydrogen has been absorbed. The use of substantially less than one molar equivalent of hydrogen results in incomplete saturation of the double bond in the four position of the steroid nucleus, whereas the use of substantially more than one molar equivalent of hydrogen does not appear to increase the yield of hydrogenated product and may in some cases even adversely affect the reaction product. The catalyst is then separated from the solution containing 11α,17β-dihydroxy-17α-methyletiocholane-3-one by conventional procedure, such as by filtration, centrifugation or decantation. Filtration is preferred. Conventional separation or extraction procedures can be used in obtaining 11α,17β-dihydroxy-17α-methyletiocholane-3-one from the solution. Preferably 11α,17β-dihydroxy-17α-methyletiocholane-3-one is separated chromatographically by passage through a column packed with a mixture of diatomaceous material, colloidal clays, activated carbons, or other conventional adsorbents, using organic solvents such as acetone, ethyl acetate, carbon tetrachloride, hexanes, methylene dichloride, chloroform, methyl ethyl ketone, or mixtures of such solvents, for elution. The eluted fractions may be evaporated to dryness leaving the crystalline residue of the desired hydrogenated product which can then be further purified by crystallization from ordinary organic solvents, or alternatively, separation may be achieved by other conventional procedures, such as concentration of the eluates, followed by seeding or fractional crystallization of the compound from solution.

Esterification may be accomplished by admixing 11α,17β-dihydroxy-17α-methyletiocholane-3-one with an acylating agent such as, for example, ketenes, an acid, acyl chloride or acyl bromide or an acid anhydride, or other known acylating agent, usually in a solvent such as, for example, pyridine or the like, or an inert solvent, including solvents such as benzene, toluene, ether, and the like, and heating or allowing to stand at a temperature between about zero degrees centigrade and the boiling point of the reaction mixture, usually about room temperature, for a period between about a half hour and about 96 hours. The time of reaction as well as the temperature at which the reaction is carried out, the acylating agent, and the ratio of reactants may be varied. The reaction mixture is then suitably poured into ice or cold water, the product collected in an appropriate solvent which is thereafter washed with successive portions of a mildly basic solution and water to obtain a solution of the product which is essentially neutral.

In some instances, the product may crystallize from the reaction mixture, in which case it may be advantageous to separate the product by filtration or other means, wash with water, and thereafter purify by conventional means, such as, for example, by recrystallization from a suitable solvent or by chromatographic purification, as deemed necessary.

The thus-described acylation process, as illustrated in greater detail in the examples following in this specification, produces the 11α-mono-esters of 11α,17β-dihydroxy-17α-methyletiocholane-3-one. Representative 11α-esters of 11α,17β-dihydroxy-17α-methyletiocholane-3-one thus produced include the formate, acetate, propionate, β-cyclopentylpropionate, butyrate, isobutyrate, valerate, isovalerate, hexanoate, heptanoate, octanoate, benzoate, phenylacetate, mono-chloroacetate, di- and trichloroacetate, salicylate, halo- and nitrobenzoates, anisate, toluate, gallate, acid succinate, maleate, tartrate, citrate, oxalate, and the like.

The following examples are illustrative of the process and products of the present invention, but are not to be construed as limiting.

PREPARATION 1.—11α-HYDROXY-17α-METHYL-TESTOSTERONE

A medium was prepared of twenty grams of Edamine enzymatic digest of lactalbumin, three grams of corn steep liquor and fifty grams of technical dextrose diluted to one liter with tap water and adjusted to a pH of 4.7 after sterilization. Three liters of this sterilized medium was inoculated with *Rhizopus nigricans* minus strain, American Type Culture Collection Number 6227b, and incubated for 24 hours at a temperature of 28 degrees centigrade using a rate of aeration and agitation such that the oxygen uptake was 6.3 to 7 millimoles per hour per liter of $Na_2SO_3$ according to the method of Cooper, Fernstrom and Miller, Ind. Eng. Chem. 36, 504 (1944). To this medium containing a 24-hour growth of *Rhizopus nigricans* minus strain was added 1.48 grams of 17α-methyltestosterone in thirty milliliters of absolute ethanol to provide a suspension of the steroid in the culture. After an additional 24-hour period of incubation under the same conditions of temperature and aeration, the beer and mycelium were extracted. The mycelium was filtered, washed twice, each time with a volume of acetone approximately equal to the volume of the mycelium, and extracted twice, each time with a volume of methylene chloride approximately equal to the volume of the mycelium. The acetone and methylene chloride extracts including solvent were added to the beer filtrate. The mixed extracts and beer filtrate were extracted successively with two one-half by volume portions of methylene chloride and then with two one-fourth by volume portions of methylene chloride. The combined methylene chloride extracts were washed with two one-tenth by volume portions of a two percent aqueous solution of sodium bicarbonate and then with two one-tenth by volume portions of water. After drying the methylene chloride with about three to five grams of anhydrous sodium sulfate per liter of solvent and filtering, the solvent was removed by distillation. The extractives, obtained upon evaporation of the methylene chloride solvent, weighed 3.3407 grams.

1.095 grams of the solvent free extractives were dissolved in 110 milliliters of benzene and chromatographed over a column containing 55 grams of alumina which had been washed with hydrochloric acid, then washed with water, and dried for four hours at 120 degrees centigrade. Developing solvents were used in 110-milliliter portions as indicated in the accompanying table.

TABLE I

| Fraction | Solvent | Eluate Solids, Milligrams |
|---|---|---|
| 1 | benzene | 13.2 |
| 2 | benzene-ether 9:1 | 11.7 |
| 3 | do | 62.1 |
| 4 | benzene-ether 1:1 | 10.1 |
| 5 | do | 5.5 |
| 6 | ether | 4.0 |
| 7 | do | 4.7 |
| 8 | do | 4.1 |
| 9 | ether-chloroform 19:1 | 6.0 |
| 10 | do | 4.1 |
| 11 | do | 4.8 |
| 12 | ether-chloroform 9:1 | 5.4 |
| 13 | do | 5.9 |
| 14 | do | 4.2 |
| 15 | ether-chloroform 1:1 | 3.8 |
| 16 | do | 11.0 |
| 17 | do | 8.0 |
| 18 | chloroform | 4.2 |
| 19 | do | 113.8 |
| 20 | do | 67.0 |
| 21 | chloroform-acetone 19:1 | 42.8 |
| 22 | do | 20.8 |
| 23 | do | 27.4 |
| 24 | chloroform-acetone 9:1 | 67.2 |
| 25 | do | 56.1 |
| 26 | do | 40.9 |
| 27 | chloroform-acetone 1:1 | 103.4 |
| 28 | do | 31.8 |
| 29 | do | 18.0 |
| 30 | acetone | 19.7 |
| 31 | do | 8.8 |
| 32 | do | 4.2 |
| 33 | acetone-methanol 1:1 | 34.2 |
| 34 | do | 12.3 |
| 35 | do | 6.5 |
| 36 | methanol | 7.4 |
| 37 | do | 2.5 |

Fractions 22 through 28, freed of solvent, were taken up in methylene chloride, slurried with 0.3 gram of Magnesol (magnesium silicate), filtered, evaporated to dryness, and crystallized from four milliliters of ethyl acetate. The resulting crystals were recrystallized from 0.5 milliliter of ethyl acetate to give 98.2 milligrams of 11α-hydroxy-17α-methyltestosterone, having a melting point of 160 to 162 degrees centigrade, and an optical rotation $[\alpha]_D^{23}$ of plus 62 degrees (C is 1.026 in chloroform).

Analysis:
Percent calculated for $C_{20}H_{30}O_3$:
C, 75.43; H, 9.50
Found:
C, 75.59; H, 9.51
C, 75.20; H, 9.54

PREPARATION 2.—PALLADIUM CATALYST SUPPORTED ON ZINC CARBONATE-ZINC OXIDE MIXTURE

Eleven grams of anhydrous zinc chloride were dissolved in 100 milliliters of water at seventy degrees centigrade and a twenty percent aqueous solution of sodium carbonate was added in excess, with constant stirring, forming a precipitate of zinc carbonate. The precipitate was filtered, washed free of alkali with warm water, and re-suspended in 100 milliliters of water forming a slurry. To the aqueous slurry was added five milliliters of a palladium chloride solution containing 0.5 gram of palladium and then one milliliter of thirty-seven percent aqueous formaldehyde solution. The resulting red-brown colored mixture was warmed on a steam bath to about sixty degrees centigrade and a thirty percent aqueous solution of sodium hydroxide then added dropwise, with continuous stirring, until the pH of the mixture reached nine, at which point palladium precipitated. The black-colored precipitate was washed by decantation with ten successive fifty-milliliter portions of water and then filtered under suction. The precipitate on the filter funnel was washed six times, dried by suction, and heated in an oven at 210 degrees centigrade for a period of eleven hours. Six and eight-tenths grams of a brown colored catalyst consisting of palladium supported on a zinc carbonate-zinc oxide mixture was obtained.

PREPARATION 3.—PALLADIUM CATALYST SUPPORTED ON CADMIUM CARBONATE

Thirteen and three-tenths grams of cadmium chloride hydrate was dissolved in 100 milliliters of water at seventy degrees centigrade and a twenty percent aqueous solution of sodium carbonate then added in small portions, with constant stirring, in slight excess until a precipitate of cadmium carbonate was formed. The precipitate was filtered, washed free of residual alkali with warm water, and re-suspended in 100 milliliters of water to form a slurry. To this slurry was added six milliliters of an aqueous solution of palladium chloride containing 0.6 gram of palladium, and then one milliliter of a thirty-seven percent aqueous solution of formaldehyde. The mixture was warmed on a steam bath to 65 degrees centigrade and a thirty percent aqueous solution of sodium hydroxide was added dropwise, with continual stirring, until the palladium precipitated at a pH of about nine. The black-colored precipitate was washed by decantation with twelve successive fifty-milliliter portions of water and then filtered by suction. The precipitate on the funnel was washed eight times, dried by suction, and heated in an oven at 110 degrees centigrade for a period of 40 hours. Seven and two-tenths grams of a catalyst consisting of palladium supported on cadmium carbonate was obtained.

Example 1.—11α,17β-dihydroxy-17α-methyletiocholane-3-one

Seven hundred and seventy-five milligrams (775 milligrams) of a mixture of palladium on zinc oxide-zinc carbonate containing 7.5 percent of palladium suspended in fifteen milliliters of methanol were hydrogenated at a super-atmospheric pressure of twenty pounds per square inch. To this mixture was added a solution of one gram of 11α-hydroxy-17α-methyltestosterone dissolved in 125 milliliters of methanol. The hydrogenation was then continued at twenty pounds per square inch until one mole equivalent of hydrogen had been absorbed. The catalyst was then removed by filtration and the filtrate was chromatographed over a column containing forty grams of a mixture consisting of activated carbon (Darco G–60) and diatomaceous earth (celite) in a one to two ratio. The following 220-milliliter fractions were collected.

TABLE II

| Fraction | Solvent | Eluate Solids, Milligrams |
| --- | --- | --- |
| 1 | acetone | 772.0 |
| 2 | do | 74.5 |
| 3 | do | 41.0 |
| 4 | do | 30.0 |
| 5 | do | 19.0 |
| 6 | do | 14.0 |
| 7 | do | 9.5 |
| 8 | do | 8.0 |
| 9 | methylene dichloride | 26.5 |
| 10 | do | 4.0 |
| 11 | do | 0.5 |
| 12 | do | 4.0 |
| 13 | do | 1.0 |

Fraction 1 of the above chromatogram was recrystallized from three milliliters of acetone and one milliliter of Skellysolve B. After an additional recrystallization from the same solvent mixture, 597 milligrams of 11α,17β-dihydroxy-17α-methyletiocholan-3-one were obtained of melting point 187 to 189 degrees centigrade. The infrared spectrum agreed with the postulated structure.

Analysis.—Percent calculated for $C_{20}H_{32}O_3$: C, 74.95; H, 10.06. Found: C, 74.85; H, 9.96.

In the same manner as given above, 11α-hydroxy-17α-methyltestosterone is hydrogenated in the presence of palladium on cadmium oxide to give 11α,17β-dihydroxy-17α-methyletiocholan-3-one.

In the same manner as given above, 11α-hydroxy-17α-methyltestosterone is hydrogenated in the presence of palladium on zinc oxide to give 11α,17β-dihydroxy-17α-methyletiocholan-3-one.

In the same manner as given above, 11α-hydroxy-17α-methyltestosterone is hydrogenated in the presence of palladium on zinc carbonate to give 11α,17β-dihydroxy-17α-methyletiocholan-3-one.

In the same manner as given above, 11α-hydroxy-17α-methyltestosterone is hydrogenated in the presence of palladium or cadmium carbonate to give 11α,17β-dihydroxy-17α-methyletiocholan-3-one.

In the same manner as given above, 11α,17β-methyltestosterone is hydrogenated in the presence of palladium on cadmium oxide-cadmium carbonate or carbon, e. g., charcoal, to give 11α,17β-dihydroxy-17α-methyletiocholan-3-one.

Example 2.—11α-formyloxy-17β-hydroxy-17α-methyletiocholan-3-one

One hundred milligrams (100 milligrams) of 11α,-17β-dihydroxy-17α-methyletiocholan-3-one, dissolved in two milliliters of dioxane, were treated with one milliliter of formic acid at room temperature. After standing for a period of sixteen hours the solution was poured into ice water and filtered. The precipitate was recrystallized from ether-hexane (Skellysolve B) mixtures to yield pure 11α-formyloxy-17β - hydroxy - 17α - methyletiocholan-3-one.

Example 3.—11α-acetoxy-17β-hydroxy-17α-methyletiocholan-3-one

One hundred milligrams (100 milligrams) of 11α,17β-dihydroxy-17α-methyletiocholan-3-one, dissolved in one milliliter of pyridine, was treated with one milliliter of acetic anhydride at room temperature. The reaction mixture was allowed to stand during a period of sixteen hours and then diluted with water to thirty milliliters. The thus-obtained precipitate, collected by filtration, weighed 41 milligrams. Extraction of the aqueous filtrate with an ether-chloroform mixture yielded 77.6 milligrams of crude 11α-acetoxy-17β-hydroxy-17α-methyletiocholan-3-one. Recrystallization from an ether-Skellysolve B (hexanes) mixture yielded pure 11α-acetoxy - 17β - hydroxy - 17α - methyletiocholan - 3 - one of melting point 153 to 154 degrees centigrade.

Analysis.—Percent calculated for $C_{22}H_{34}O_4$: C, 72.89; H, 9.45. Found: C, 72.62; H, 9.27.

Example 4.—11α-propionoxy-17β-hydroxy-17α-methyletiocholan-3-one

In the same manner as in Example 3, 11α-propionoxy-17β-hydroxy-17α-methyletiocholan-3-one is prepared by reacting 11α,17β-dihydroxy-17α-methyletiocholan-3-one with propionic anhydride in pyridine.

*Example 5.—11α-(β-cyclopentyl)-propionyloxy-17β-hydroxy-17α-methyletiocholan-3-one*

In the same manner as in Example 3, 11α-(β-cyclopentyl) - propionyloxy - 17β - hydroxy - 17α - methyletiocholan-3-one is prepared by reacting 11α,17β-dihydroxy-17α-methyletiocholan-3-one with β-cyclopentylpropionyl chloride in pyridine.

*Example 6.—11α-benzoxy-17β-hydroxy-17α-methyletiocholan-3-one*

In the same manner as in Example 3, 11α-benzoxy-17β-hydroxy-17α-methyletiocholan-3-one is prepared by reacting 11α,17β-dihydroxy-17α-methyletiocholan-3-one with more than about two molar equivalents of benzoyl chloride in pyridine.

*Example 7.—11α-salicylyloxy-17β-hydroxy-17α-methyletiocholan-3-one*

11α- salicylyloxy-17β-hydroxy-17α- methyletiocholan-3-one is prepared by reacting 11α,17β-dihydroxy-17α-methyletiocholan-3-one with an excess of salicylyl chloride.

In a similar manner, other esters of 11α,17β-dihydroxy-17α-methyletiocholan-3-one are prepared according to acylation procedures illustrated above, or by reactions with ketene, ketenes of selected acids, selected acids, acid anhydrides, or acid chlorides, in an organic solvent such as pyridine or the like. Representative esters of 11α,17β-dihydroxy-17α-methyletiocholan-3-one thus-prepared include one to eight carbon atom carboxylic acid acyloxy esters of saturated or unsaturated aliphatic carbocyclic, or cycloaliphatic, aryl, arylalkyl, alkaryl, mono, di- or polycarboxylic acids having less than eight carbon atoms and which form ester groups such as, for example, dimethylacetoxy, trimethylacetoxy, butyryloxy, isobutyryloxy, valeryloxy, hexanoyloxy, heptanoyloxy, octanoyloxy, phenylacetoxy, toluoyloxy, cyclopentylformyloxy, α-cyclopentylpropionyloxy, acrylyloxy, cyclohexylformyloxy, the half and di-esters of polybasic acids such as malonic, maleic, succinic, glutaric and adipic acids, and the like. The acids may also contain non-interfering substituents, such as mono or poly chloride, bromo, hydroxy, methoxy, and the like if desired.

It is to be understood that this invention is not to be limited to the exact details of operation or exact compounds shown and described as obvious modifications and equivalents will be apparent to one skilled in the art and the invention is therefore to be limited only by the scope of the appended claims.

We claim:

1. An 11α - oxygenated-17β-hydroxy-17α-methyletiocholan-3-one of the formula:

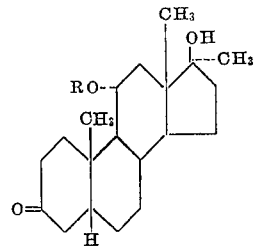

wherein R is selected from the groups consisting of hydrogen and the acyl radical of a hydrocarbon carboxylic acid containing less than nine carbon atoms.

2. 11α,17β-dihydroxy-17α-methyletiocholan-3-one.

3. An 11α-acyloxy-17β-hydroxy-17α-methyletiocholan-3-one wherein the acyloxy group is of the formula AcO, Ac being the acyl radical of a hydrocarbon carboxylic acid containing less than nine carbon atoms.

4. 11α-acetoxy-17β-hydroxy - 17α - methyletiocholan-3-one.

5. 11α - propionyloxy-17β-hydroxy-17α-methyletiocholan-3-one.

6. 11α-(β-cyclopentyl)-propionyloxy-17β-hydroxy-17α-methyletiocholan-3-one.

7. 11α-benzoyloxy-17β-hydroxy-17α-methyletiocholan-3-one.

8. In a process of preparing a compound selected from the group consisting of 11α,17β-dihydroxy-17α-methyletiocholan-3-one and 11α-acylates thereof, the step of hydrogenating 11α-hydroxy-17α-methyltestosterone with hydrogen in the presence of a palladium catalyst and separating 11α,17β-dihydroxy-17α-methyletiocholan - 3 - one from the hydrogenation product.

9. The process of claim 8 wherein the catalyst is supported on a catalyst support selected from the group consisting of the carbonate, oxide, and mixtures of the carbonate and oxide, of a group 2B element of the periodic table.

10. In a process of preparing a compound selected from the group consisting of 11α,17β-dihydroxy-17α-methyletiocholan-3-one and 11α-acylates thereof, the steps of hydrogenating 11α-hydroxy-17α-methyltestosterone with hydrogen in the presence of a supported palladium catalyst, separating the hydrogenated product, and treating the thus-obtained 11α,17β-dihydroxy-17α-methyletiocholan-3-one with an acylating agent to obtain an 11α-acyloxy-17β-hydroxy-17α-methyletiocholan-3-one.

11. The process of claim 10 wherein the catalyst is supported on a catalyst support selected from the group consisting of the carbonate, the oxide, and mixtures of the carbonate and oxide of a group 2B element of the periodic table.

12. The process of claim 10 wherein the acylating agent is acetic anhydride.

13. The process of claim 10 wherein the acylating agent is propionic anhydride.

14. The process of claim 10 wherein the acylating agent is a cyclopentylpropionyl halide.

15. The process of claim 10 wherein the acylating agent is a benzoyl halide.

No references cited.